(12) United States Patent
Shah et al.

(10) Patent No.: US 7,454,592 B1
(45) Date of Patent: Nov. 18, 2008

(54) BLOCK-LEVEL AND HASH-BASED SINGLE-INSTANCE STORAGE

(75) Inventors: Aalop S. Shah, Pune (IN); Ganesh Varadarajan, Pune (IN); Milind V. Borate, Pune (IN); Peter Vajgel, Menlo Park, CA (US)

(73) Assignee: Symantec Operating Corporation, Cupertino, CA (US)

( * ) Notice: Subject to any disclaimer, the term of this patent is extended or adjusted under 35 U.S.C. 154(b) by 268 days.

(21) Appl. No.: 11/355,684

(22) Filed: Feb. 16, 2006

(51) Int. Cl.
*G06F 12/00* (2006.01)
(52) U.S. Cl. .................................... 711/216
(58) Field of Classification Search ............... None
See application file for complete search history.

(56) References Cited

U.S. PATENT DOCUMENTS 7,069,413 B1 * 6/2006 Agesen et al. ............ 711/207

OTHER PUBLICATIONS

Bolosky, William J., et al., "Single Instance Storage in Windows 2000," Microsoft Research, Balder Technology Group, Inc., Downloaded Jan. 13, 2006 from http://research.microsoft.com/sn/Farsite/WSS2000.pdf, 12 pages.

Quinlan, Sean and Sean Dorward, "Venti: a New approach to archival storage," USENIX Association, Proceedings of the FAST 2002 Conference on File and Storage Technologies, Monterey, California, Jan. 28-30, 2002, 14 pages.

* cited by examiner

*Primary Examiner*—Hiep T Nguyen
(74) *Attorney, Agent, or Firm*—Campbell Stephenson LLP (57) ABSTRACT

A method for reading data in a block-level single-instance storage system may involve receiving a first address of a data block, retrieving a signature corresponding to the first address, and reading data from a second address corresponding to the signature. A storage system may include a storage manager and first and second lookup tables. The storage manager may interface with an application (such as a database system or a file system) that uses a first set of identifiers for data blocks. The storage manager may use a second set of identifiers for the data blocks, and translates between the first and second identifiers using the lookup tables. The first lookup table indexes data block signatures according to the first set of identifiers. The second lookup table indexes the second set of identifiers according to the data block signatures. The second lookup table may be pruned to provide single instance storage.

25 Claims, 9 Drawing Sheets

FIG. 1

| Logical Address | Physical Address |
|---|---|
| 0000001 | 003672897529 |
| 0000002 | 004289762638 |
| 0000003 | 000736825630 |
| 0000004 | 000384729284 |
| ... | ... |

210 → (row 1)
220 → (row 2)
230 → (row 3)
240 → (row 4)

| Logical Address | Hash |
|---|---|
| 410 → 0000001 | 2fd4e1c67a2d28fced849ee1bb76e7391b93eb12 |
| 420 → 0000002 | de9f2c7fd25e1b3afad3e85a0bd17d9b100db4b3 |
| 430 → 0000003 | a14f6b363524d657c63ad4c24e56b32f35a4a357 |
| 440 → 0000004 | 2fd4e1c67a2d28fced849ee1bb76e7391b93eb12 |
| ... | ... |

| Hash | Physical Address | Reference Count |
|---|---|---|
| ... | ... | ... |
| 510 → 2fd4e1c67a2d28fced849ee1bb76e7391b93eb12 | 003672897529 | 2 |
| ... | ... | ... |
| 530 → a14f6b363524d657c63ad4c24e56b32f35a4a357 | 000736825630 | 1 |
| ... | ... | ... |
| 520 → de9f2c7fd25e1b3afad3e85a0bd17d9b100db4b3 | 004289762638 | 1 |
| ... | ... | ... |

| | Storage |
|---|---|
| | ... ... |
| 630 → | 000736825630: BBBBBBBBBBBBBBBBBBBBBBBBBBBBBB... |
| | ... ... |
| 610 → | 003672897529: AAAAAAAAAAAAAAAAAAAAAAAAAAAAAA... |
| | ... ... |
| 620 → | 004289762638: CCCCCCCCCCCCCCCCCCCCCCCCCCCCCC... |
| | ... ... |

FIG. 10

BLOCK-LEVEL AND HASH-BASED SINGLE-INSTANCE STORAGE

FIELD OF THE INVENTION

This invention relates to data storage in general and, more particularly, to methods and systems for performing single instance storage.

DESCRIPTION OF THE RELATED ART

Distributed storage systems are an increasingly important part of research, governmental, and enterprise computing systems. Among the advantages of such computing systems are their ability to handle multiple-server environments, high-volume data retrieval, and various archiving requirements. Such distributed computing systems typically utilize one or more storage devices in support of the computing systems operations performed by one or more processing host computers. These storage devices may be quite numerous and/or heterogeneous. Various techniques are used to ensure that storage systems can efficiently use their available storage capacity.

Figure 1:
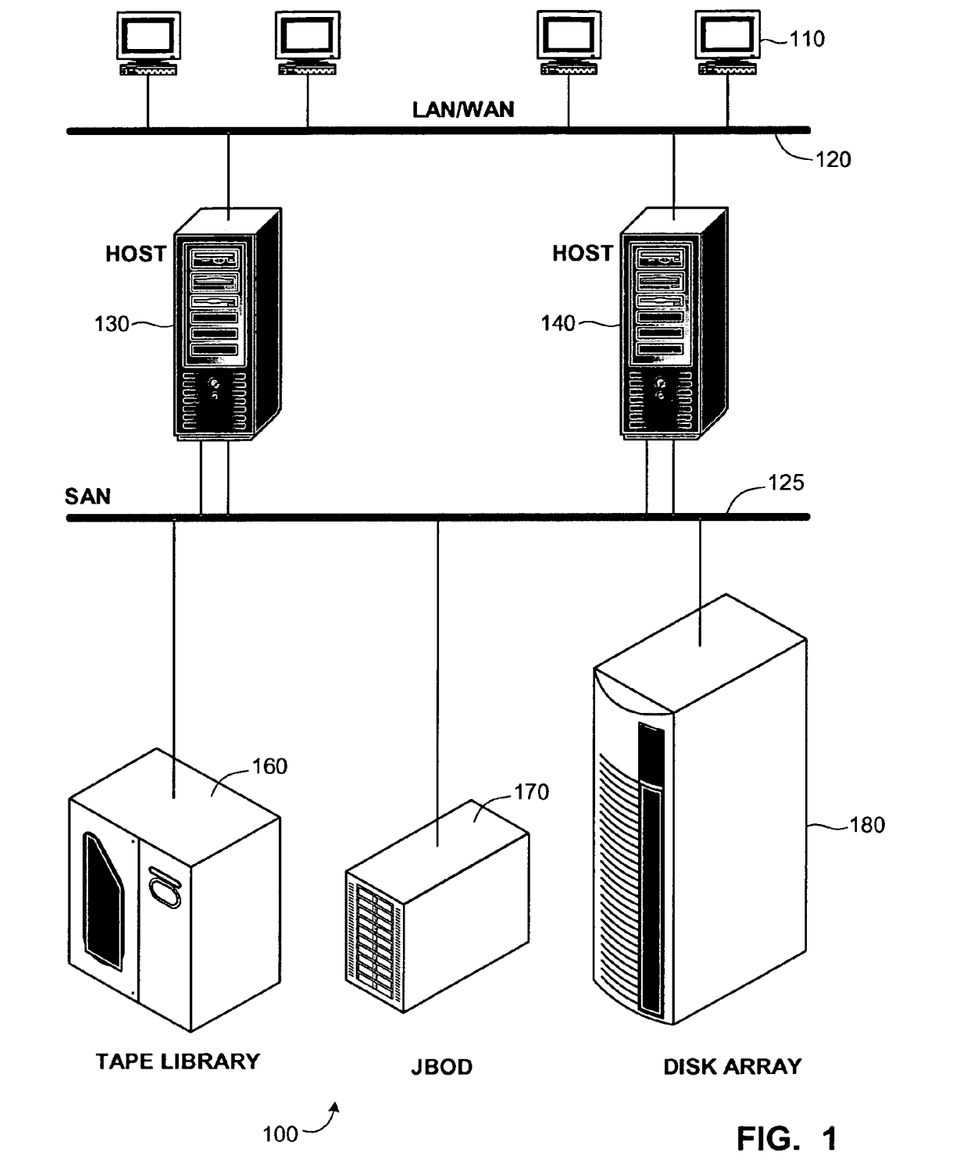
FIG. 1 is a simplified block diagram of one implementation of a computing system.

FIG. 1 is a simplified block diagram of a computing system 100. The members of the computing system 100 include hosts 130 and 140. The hosts 130 and 140 may typically be computer systems that include software and hardware components well known to those having skill in the art. In various settings, the hosts may also be referred to as nodes, reflecting their participation in a networked system. In support of various applications and operations, the hosts may exchange data over, for example, a network 120 such as an enterprise-wide intranet or other local area network (LAN), or over a wide area network (WAN) such as the Internet. Additionally, the network 120 may allow the various client computer systems 110 to communicate with the hosts 130 and 140.

Other elements of computing system 100 may include a storage area network (SAN) 125 and storage devices such as a tape library 160 (typically including one or more tape drives), a group of disk drives 170 (e.g., "just a bunch of disks" or "JBOD"), and a storage array 180 such as an intelligent disk array. As shown in FIG. 1, the hosts 130 and 140 may be coupled to the SAN 125. The SAN 125 is conventionally a high-speed network that allows the establishment of direct connections between the storage devices 160, 170, and 180 and the hosts 130 and 140. The SAN 125 may also include one or more SAN-specific devices such as SAN switches, SAN routers, SAN hubs, or some type of storage appliance. The SAN 125 may also be coupled to additional hosts. Thus, the SAN 125 may be shared between the hosts may and allow for the sharing of storage devices between the hosts to provide greater availability and reliability of storage. Although the hosts 130 and 140 are shown connected to the storage devices 160, 170, and 180 through the SAN 125, this need not be the case. Shared resources may be directly connected to some or all of the hosts in the computing system, and the computing system 100 need not include a SAN. Alternatively, the hosts 130 and 140 may be connected to multiple SANs.

The hosts 130 and 140 may execute one or more application programs. Such applications may include, but are not limited to, database administration systems, file servers, application servers, file systems, web servers, backup and restore software, customer relationship management software, and the like. The applications and other software, such as operating systems and applications executing on client computer systems, may initiate or request input or output (I/O) operations against storage devices such as the storage array 180. The I/O operations may be managed through file systems on the hosts that are configured to handle the communication of data between the hosts and the storage devices. The hosts may also execute volume manager software that enables physical storage resources configured in the computing system to be managed as one or more logical storage devices. An example of software that performs some or all of the functions of a volume manager is the VERITAS Volume Manager™ product provided by Symantec Corporation.

A file system executed on a host such as host 130 may be configured to refer to data on one or more of the storage devices by a logical address. Depending on the implementation of the host, the file system may be considered either an application or a component of the operating system on the host. The logical address for data may generally be different than the physical address that is used by the storage devices to refer to that data. For example, a file system may use a set of logical addresses that identify data stored on one or more virtual devices implemented on the storage devices. The storage devices, however, may use another form of addressing to refer to the stored data, such as device block numbers or cylinder/track numbers. In order to perform translations between the logical addresses used by a file system and the physical addresses used by storage devices, the host 130 may use a lookup table.

Figure 2:
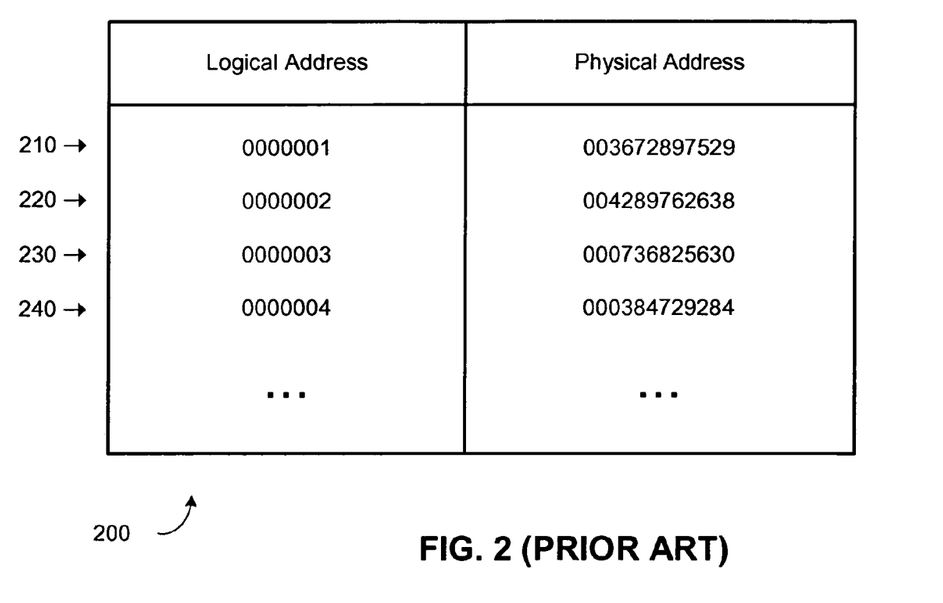
FIG. 2 illustrates one implementation of an address lookup table.

FIG. 2 illustrates one implementation of an address lookup table 200. The address lookup table indexes physical addresses according to logical addresses. The illustrated example shows four entries 210, 220, 230, and 240, each of which is identified by a logical address. A physical address that corresponds to the logical address is included in each entry. The four entries have four different physical addresses—one for each of the four different logical addresses. Such a table may be used by the host 130 to translate between the two types of addressing. Thus, if the file system on the host 130 uses logical addresses for referring to stored data, and a volume manager on the host 130 uses physical addresses to access the data, the volume manager may consult the address lookup table 200 to convert a logical address into a physical address. As illustrated in this example, the entries in the address lookup table 200 are sorted or otherwise accessible by the logical addresses. Thus, with this table 200 the volume manager may readily determine which physical address corresponds to a logical address.

Figure 3:
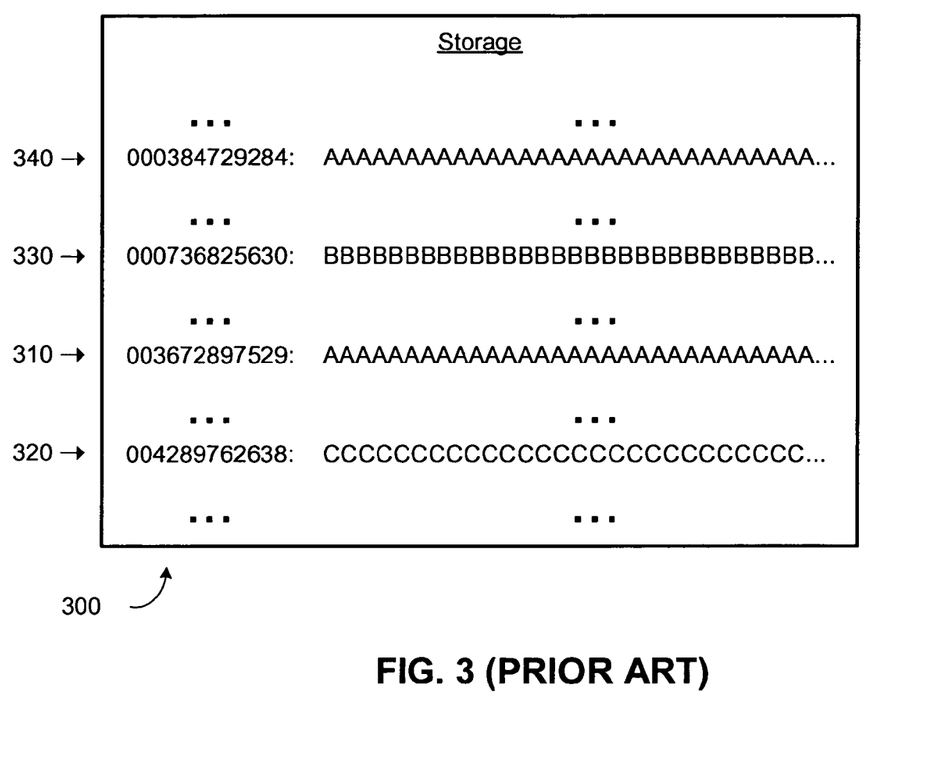
FIG. 3 is a block diagram of one implementation of a storage system.

FIG. 3 is a block diagram of one implementation of a storage system 300. The storage system 300 may correspond to one or more of the storage devices 160, 170, and 180. This diagram illustrates the use of physical addresses and data that are stored according to the physical addresses. The illustrated example shows four data blocks 310, 320, 330, and 340, each of which is identified by a physical address (corresponding to the physical addresses indicated in FIG. 2), and each of which holds data. The physical addresses are illustrated as being numerical values. Depending on the implementation of the storage system, the physical addresses may be indicative of physical storage devices, or of network addresses of storage devices, or of physical locations on media in the physical storage devices, or combinations thereof.

As shown in FIG. 3, a storage system may include repeated information. In the illustrated example, the data stored at one address, in data block 310, are the same as the data stored at another address, in data block 340. Such repetitions may arise for a variety of reasons. For example, more than one copy of a file may be present in the storage system, having been placed there by one user or by several different users. Similarly, various versions or revisions of a file may be stored on the storage system, with each version or revision differing only partially from the others. As a result, the common data in the various copies, versions, and revisions may result in repeated sequences of data on the storage system. In this example, the repeated information appears as two data blocks 310 and 340 that hold the same data as the other.

It may be seen that only one of these data blocks 310 and 340 is needed. The repetition of the data uses additional storage that could theoretically be released for other data. This unintended repetition of stored data poses a problem for the efficiency of data storage systems. If the repeated data could be eliminated (so that only one copy of the data is stored, instead of repeated copies), the storage system would be able to hold greater amounts of data, since additional storage capacity would be freed by deleting the repeated data.

SUMMARY

Various embodiments of methods and systems for performing data storage are disclosed. One implementation of a method involves receiving a first address of a data block, retrieving a signature corresponding to the first address, and retrieving a second address corresponding to the signature.

A second implementation of a method involves receiving a first address, identifying data to be written at the first address, searching a first lookup table for the first address, generating a signature corresponding to the data, searching a second lookup table for the signature, and updating the first lookup table.

One implementation of a system involves a storage manager, a first lookup table, and a second lookup table. The storage manager is configured to interface with an application (such as a database system or a file system, among others). The application is configured to identify data blocks according to a first set of identifiers for the data blocks. The storage manager is configured to access the data blocks on a storage medium according to a second set of identifiers for the data blocks. The first lookup table indexes data block signatures according to identifiers from the first set of identifiers. The second lookup table indexes identifiers from the second set of identifiers according to the data block signatures.

The second lookup table may eliminate redundant information by referencing only a single identifier from the second set of identifiers for each unique data block signature. This elimination may serve as a pruning of the data blocks referenced by the second set of identifiers, and may be used to provide single-instance storage.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

One approach to eliminating repeated information on a storage system is to perform comparisons of files stored on a storage device to determine if two files are duplicates of each other. Such file-by file comparisons, however, would not resolve smaller duplications of data on a storage system. In particular, such systems would not provide single-instance storage (SIS) at the block level of a storage system.

It would be helpful to have an SIS system that operates at the block level. For example, various implementations of such a system may be better able to find instances of repeated data, since they could find smaller occurrences of the repeated data. Consider the situation where two large files on a storage system are only slightly different, with 99% of the data in one file being identical to data in the other file. Since the two files are not exactly the same, a file-level SIS system would maintain two separate copies of these large files. However, a block-level SIS management system may be able to eliminate the repeated blocks in one of the files, since these blocks may be the same as the blocks in the other file. The block-level SIS management system may thus be much more efficient at eliminating data repetition on the storage devices.

Block-level SIS management may also provide an advantage of incorporating SIS management into regular block-based reads and writes. This aspect may facilitate the integration of SIS techniques into existing storage systems. Still further, this aspect may facilitate the performance of SIS operations by combining them with read and write operations. For example, SIS operations may then be possible without needing a separate after-the-fact SIS groveller procedure that examines storage devices after files have been written onto the storage devices.

Conceptually, one approach to implementing SIS at the block level would be to maintain a list of the contents of the blocks in a storage system. Such a "contents list" could be sorted according to the contents of the individual blocks, and any duplicate blocks would be readily identified, since they would appear adjacent to each other in the sorted contents list. Once the duplicate blocks are identified, they could be eliminated from the storage system, so that the storage system may maintain at most one copy of each unique block being stored.

The immediate problem with the concept of a contents list is that it would require an inordinate amount of storage to maintain: the contents list would need roughly as much storage as the original storage system, since each data block from the storage system would be copied into the contents list. Thus, a storage system that includes storage devices 160, 170, and 180 would effectively require another unit of each of these devices in order to hold the contents list. This additional requirement would hinder the purpose of improving storage efficiency.

An alternative to the conceptual contents list is a list of signatures. The signatures may be checksums or hashes of the contents of respective blocks stored on the storage system. In general, the signatures may serve as fingerprints of the contents of the respective data blocks on the storage system, or may otherwise be identifiers of portions of data on the storage system. In general, the signature of a data block may be significantly smaller than the data block itself. For example, a data block on a storage device may hold 4 kB of data. In contrast, a signature such as one generated with the SHA-1 (secure hash algorithm) function may be substantially smaller, with a length of only 160 bits. With an appropriately selected signature type, a list of signatures may be used as a practical substitute for the conceptual list of the contents of the storage system.

Other functions may be used to generate smaller or larger signatures, and block sizes may also be smaller or larger. For example, larger or smaller data blocks may also be used (e.g., approximately 512 B, 1 kB, 4 kB, 8 kb, 16 kB, or variable block sizes), and larger or smaller signatures may also be used (e.g., approximately 40 bits, 60 bits, 80 bits, 200 bits, or 500 bits, or variable signature lengths). In general, the signature length may be appropriately chosen so that the signatures are substantially shorter than the sections of data that they represent, but are long enough that they can be expected to identify uniquely the various sections of data on a storage system.

Figure 4:
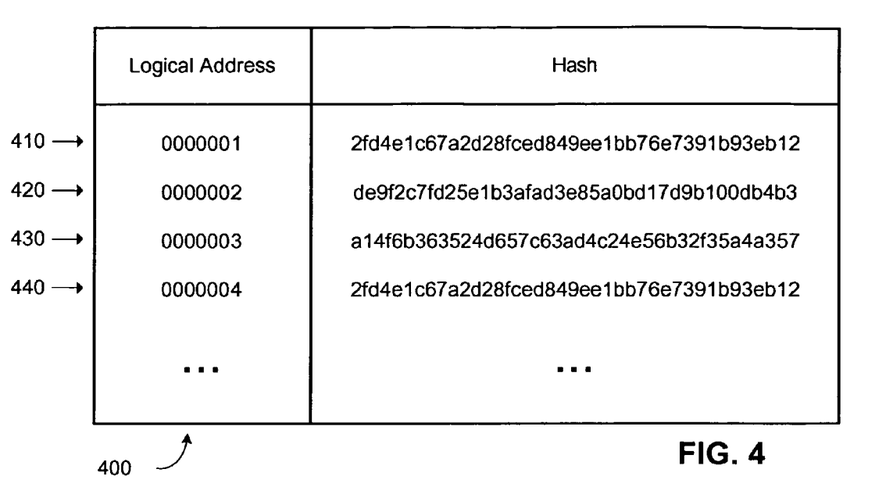
FIG. 4 illustrates one implementation of a hash lookup table.
Figure 5:
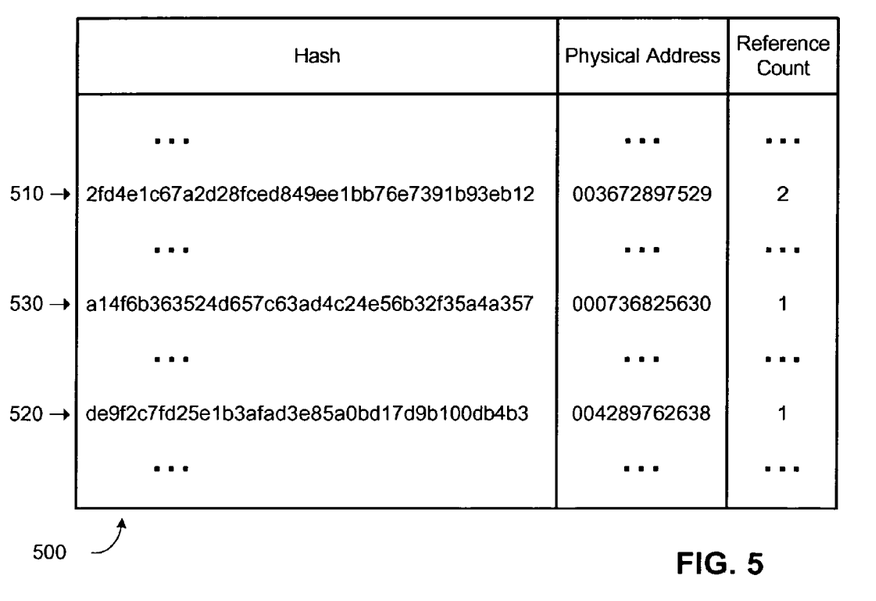
FIG. 5 illustrates one implementation of a physical-address lookup table.

FIGS. 4 and 5 illustrate one implementation of a hash lookup table 400 and a physical-address lookup table 500. These two tables may be used by various storage systems to implement a block-level single-instance storage system.

The hash lookup table 400 indicates the contents of data stored at various logical addresses in a data system. The contents stored at each logical address are indicated by a hash (or other signature) of the contents. The illustrated example shows four entries 410, 420, 430, and 440. Each entry is identified by a logical address. A hash value that corresponds to the data referenced by the logical address is also included in each entry.

The hashes may generated by a hash function, such as SHA-1, that receives a string of input data and in response generates a hash (a relatively short string of data) as a signature of the input data. The contents stored at each address may be entered into the hash function to generate the hash for those contents. The hash function may be chosen to be a one-to-one function, so that if two signatures generated by the hash function are different from each other, then the corresponding two data blocks must also have been different from each other. The hash function may also be chosen to be collision-resistant. That is, if any two signatures in the table are identical, it may be expected that the corresponding data blocks are also identical.

In the illustrated example, the hash lookup table 400 includes two entries that have the same hash value. Entries 410 and 440 hold identical hash values. This repetition of hash values indicates that these two logical addresses refer to identical data. (This illustration recalls the situation in FIGS. 2 and 3, where entries 210 and 240 referred to data blocks 310 and 340 that held repeated data.)

The hash lookup table 400 may be used by a host such as the host 130 to find a hash of a data block based on the logical address of the data block. Thus, if a file system running on the host 130 uses logical addresses for referring to stored data and a volume manager running on the host 130 uses physical addresses to access the data, the volume manager may consult the hash lookup table 400 to convert a logical address into a hash for the data to be accessed. To find the physical address of the data, the volume manager may then turn to the physical-address lookup table 500.

The physical-address lookup table 500 indicates the physical address of data that has a particular hash. The illustrated example shows three entries 510, 520, and 530. Each entry is identified by a hash value. Each entry also indicates a physical address of data corresponding to the hash. A volume manager may consult the physical-address lookup table 500 to convert a hash for the data to be accessed into a physical address for the data. The pair of lookup tables 400 and 500 may thus be used together, one after the other, to obtain the information that is present in address look-up tables such as table 200 from FIG. 2. The pair of lookup tables 400 and 500 may therefore serve to replace table 200.

The illustrated physical-address lookup table 500 shows only three entries 510, 520, and 530. This is fewer than the corresponding four entries in the hash lookup table 400. The reason why the physical-address lookup table 500 may have fewer entries is that the hash lookup table may have repeat entries. In this example, one of the entries in the hash lookup table 400 is a repeat entry. Since there are only three unique hashes shown in the hash lookup table 400, the physical-address lookup table 500 needs only three corresponding entries. Entries 410 and 440, which held identical hash values in table 400, are reflected in table 500 as a single entry 510.

This entry 510 serves a dual purpose. As can be seen from FIGS. 4 and 5, it may be used when a data storage system needs to access the logical address in entry 410. It is also used when the data storage system needs to access the logical address in entry 440. These two logical addresses are both resolved by the hash lookup table 400 to the same hash value. Accordingly, the one entry 510 in the physical-address lookup table 500 serves both of these logical addresses. To indicate that this entry is being used by more than one logical address, the physical-address lookup table 500 may include an associated reference count. The reference count may be an indicator of the number of logical addresses associated with a particular hash value. In the illustrated example, entry 510 includes a reference count of 2, since this entry has two logical addresses associated with its hash value. The other entries 520 and 530 include a reference count of 1, since these entries each have only one logical address associated with their hash values.

Since the pair of lookup tables 400 and 500 together can translate logical addresses into physical addresses, they may serve to replace table 200. However, the pair of lookup tables 400 and 500 also includes additional information: they index the data stored in the various blocks of the data storage system, as referenced by the corresponding hashes. This additional information may provide various advantages. For example, the pair of lookup tables 400 and 500 may be used to eliminate repeated data in a storage system, as discussed below.

Figure 6:
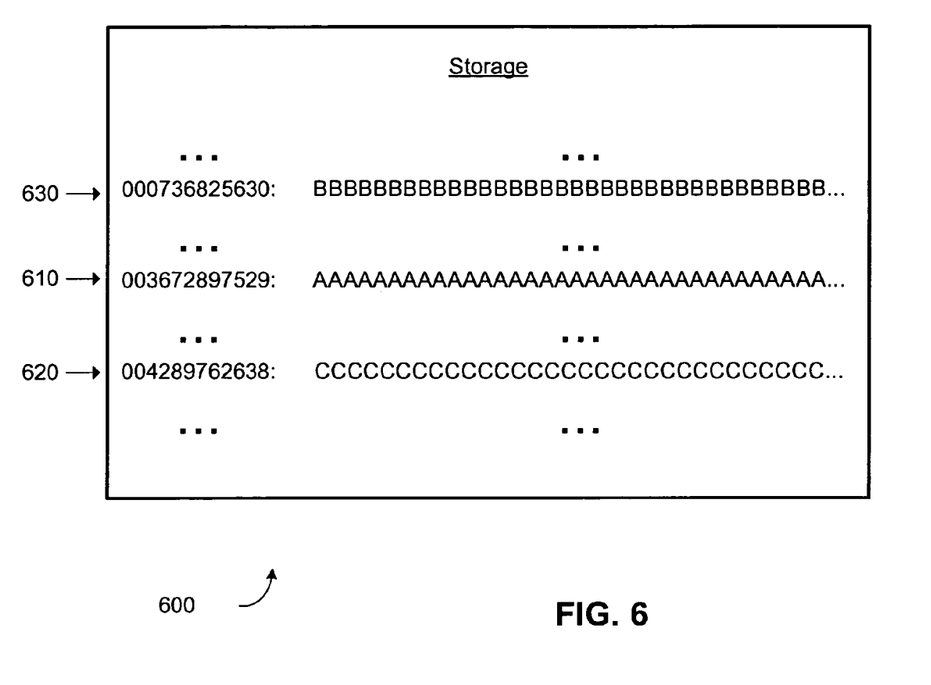
FIG. 6 is a block diagram of one implementation of a storage system with single-instance storage.

FIG. 6 is a block diagram of one implementation of a storage system 600 with single-instance storage. The storage system 600 may be implemented, for example, in one or more of the storage devices 160, 170, and 180. The illustrated example shows three data blocks 610, 620, and 630, each of which is identified by a physical address (corresponding to the physical addresses indicated in FIG. 5), and each of which holds a block of data. The storage system 600 uses physical addresses and holds data that are stored according to the physical addresses. The physical addresses are illustrated as being numerical values. Depending on the implementation of the storage system, the physical addresses may be indicative of physical storage devices, or of network addresses of storage devices, or of physical locations on media in the physical storage devices, or combinations thereof.

In contrast with the storage system 300 from FIG. 3, the storage system 600 does not include repeated data blocks. One of the repeated data blocks (340) from the storage system 300 has been eliminated in the storage system 600. The storage system 600 may therefore be understood as an SIS system. With repeated data blocks eliminated, the storage system 600 may be able to hold greater amounts of data than the storage system 300.

The logical addresses, the physical addresses, and the hashes in lookup tables 400 and 500 are different types of identifiers for data stored in a data storage system. The logical addresses and the physical addresses in lookup tables 400 and 500 are considered to be addresses, since these identifiers are assigned to stored data. These assigned identifiers may indicate the location of the stored data. The hashes in lookup tables 400 and 500 are considered to be signatures, since these identifiers are derived from the stored data. These derived entries may be characteristic of the stored data itself, and may be independent of the locations of the stored data.

The lookup tables 400 and 500 translate one type of addressing into another type of addressing, using signatures as an intermediate translation. In the examples of FIGS. 4 and 5, the two types of addressing are logical addresses and physical addresses. It will be understood that other types of addressing may also be translated through the lookup tables 400 and 500. For example, these tables may be adapted to translate one type of logical address (for example, logical addresses used by a file system) into another type of logical address (for example, a different set of logical addresses, as used by a data storage device, a data storage server, or a virtual-device storage system).

The lookup tables 400 and 500 may be used in various storage environments. For example, these tables may be useful in environments where different layers of storage access use different types of addressing. As one example, one layer of storage access may refer to addresses on variable custom-sized logical units or other virtual storage devices, while a lower layer of storage access may refer to addresses on the underlying fixed-sized volumes on which the logical units are maintained.

Various alternatives are contemplated for the lookup tables 400 and 500. For example, alternative indexing structures may be used in the place of lookup tables, such as trees, hash tables, various linked-list structures, and others that may be used to hold the mapping information between the various addressing systems and the corresponding collection of hashes.

Various implementations of the above techniques may be used to adapt a system so that two otherwise disparate addressing systems may be used together. For example, these techniques may be useful in situations where a storage device that uses one type of addressing is brought into an environment where a different type of addressing is used by a file system (or other applications, such as database software). Using the two lookup tables as a translation mechanism, the new storage device may be made accessible to the file system or other applications without needing the file system (or other applications) to be internally modified to use the same addressing system as the storage device. This feature may be helpful in various situations, such as where the storage device is configured to support single-instance storage, and may therefore require an addressing system that is different from the addressing used by other components in the computing environment.

Figure 7:
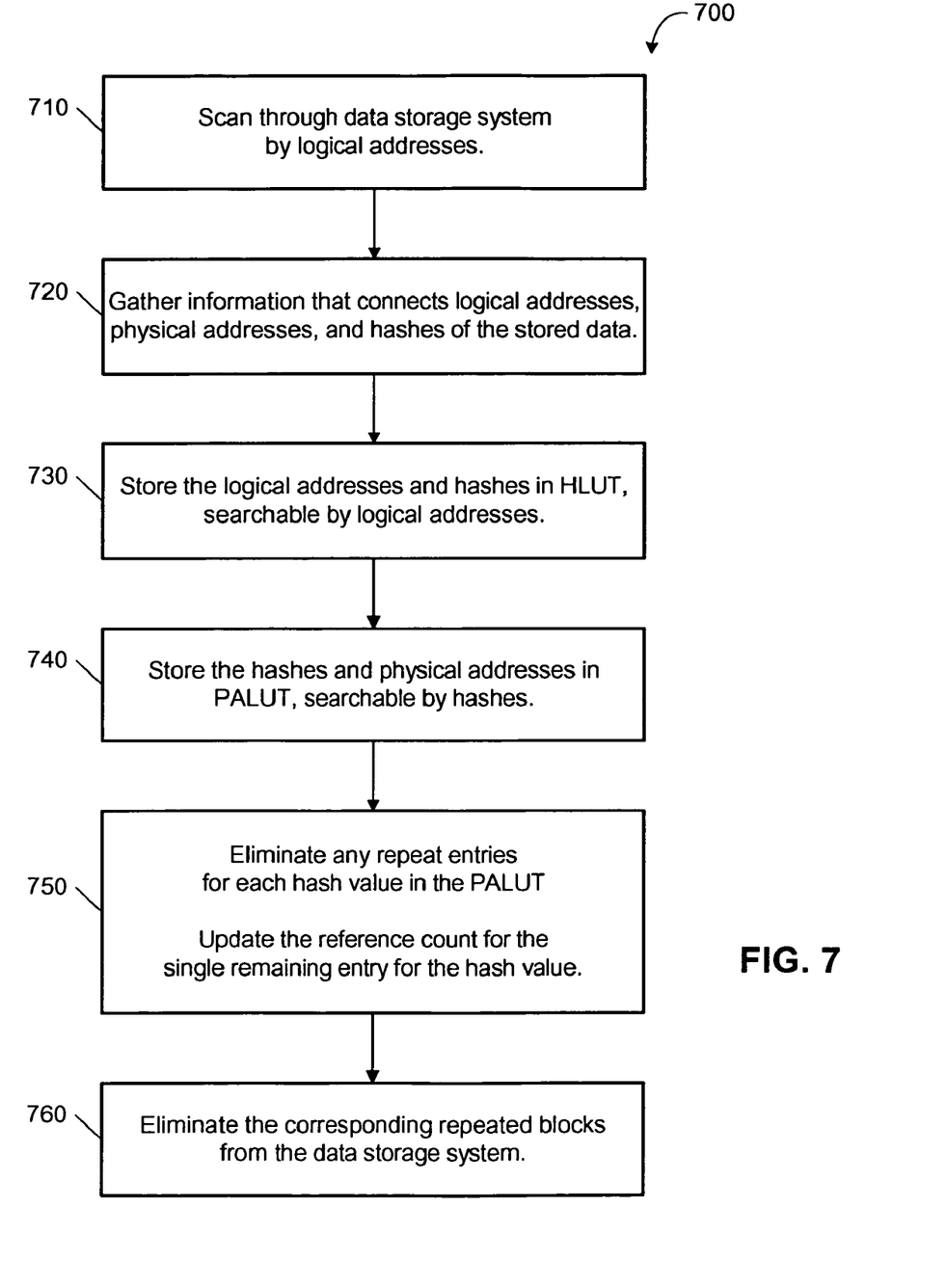
FIG. 7 is a flow diagram of one implementation of a procedure for eliminating redundant data from a storage system.

FIG. 7 is a flow diagram of one implementation of a procedure 700 for eliminating redundant data from a storage system. This procedure may be used to generate the lookup tables 400 and 500 for the storage system. The procedure 700 may also be used to convert a non-SIS storage system (such as storage system 300) into an SIS system (such as storage system 600).

The procedure starts in act 710 by scanning through the data stored on the disk drives and other storage devices in a storage system. The scan may be done sequentially according to the logical addresses in the storage system. For each logical address, the corresponding physical address may be found from an existing lookup table (such as, for example, the table 200 from FIG. 2). From each physical address, a block of data may be read. For each block of data, a corresponding hash may be computed. These three aspects of each data block (logical address, physical address, and hash) are gathered in act 720. As the scan proceeds, the procedure may build a temporary table with three sets of information: logical addresses, the corresponding physical addresses, and the hashes of the data stored at each physical addresses.

From this temporary table, the logical addresses and hashes may be extracted in act 730 to form the hash lookup table 400 ("HLUT"). The temporary table may then be sorted according to the hashes, so that is searchable by hashes. In act 740 the hashes and physical addresses may then be extracted to create a preliminary version of the physical-address lookup table 500 ("PALUT").

The hash lookup table 400 and the preliminary version of the physical-address lookup table 500 may include more than one entry for each of the hashes, since they represent a storage system in which repeated data may be stored at more than one physical address. The repeated entries are kept in the hash lookup table. However, in act 750, the preliminary version of the physical-address lookup table 500 may be pruned to eliminate repeated entries.

The repeated entries may be easily pruned from preliminary version of the physical-address lookup table 500, since the repeat entries will be listed next to each other, sorted by their signature hashes. Eliminating these repeated entries in the act 750 may be understood as cleaning out unneeded references to duplicate data blocks on the storage system. Eliminating these repeated entries creates the working physical-address lookup table 500.

To track the fact that repeated hash entries have been eliminated, a reference count may be maintained for each hash entry. In the working physical-address lookup table 500, the reference count may indicate the number of entries in the original data set that have a particular hash. The reference count is shown in FIG. 5 as an additional column of the physical-address lookup table 500. In other implementations, the reference count may be stored separately from the physical-address lookup table 500. The reference count may initially be set to a value of 1 for each entry in the physical-address lookup table 500. If repeated entries in the physical-address lookup table 500 are eliminated for a particular hash value, the reference count is updated in the act 750 for the remaining single entry. The updated reference count indicates the original number of data blocks that were present for that hash value.

While the physical-address lookup table 500 is being pruned, the data storage system may also be converted to an SIS system by eliminating the corresponding repeated data blocks in act 760. As repeated hash entries are eliminated from the physical-address lookup table 500, the repeated blocks may also be erased or otherwise ignored from the corresponding physical addresses on the physical storage devices. Erasing or ignoring the repeated information on the physical storage devices may make storage capacity available for further use, thereby improving the efficiency of the storage system. When each of the repeated data blocks have been eliminated from the data storage system, the data storage system may be considered an SIS system.

The storage system 600 may be generated by applying the procedure 700 to a non-SIS storage system, such as the storage system 300 from FIG. 3. For example, the acts 710-750 may be used to create the lookup tables in FIGS. 4 and 5 from the lookup table and the storage system in FIGS. 2 and 3. Similarly, the act 760 may eliminate the repeated data blocks from the non-SIS system in FIG. 3 to create the SIS system illustrated in FIG. 6.

Figure 8:
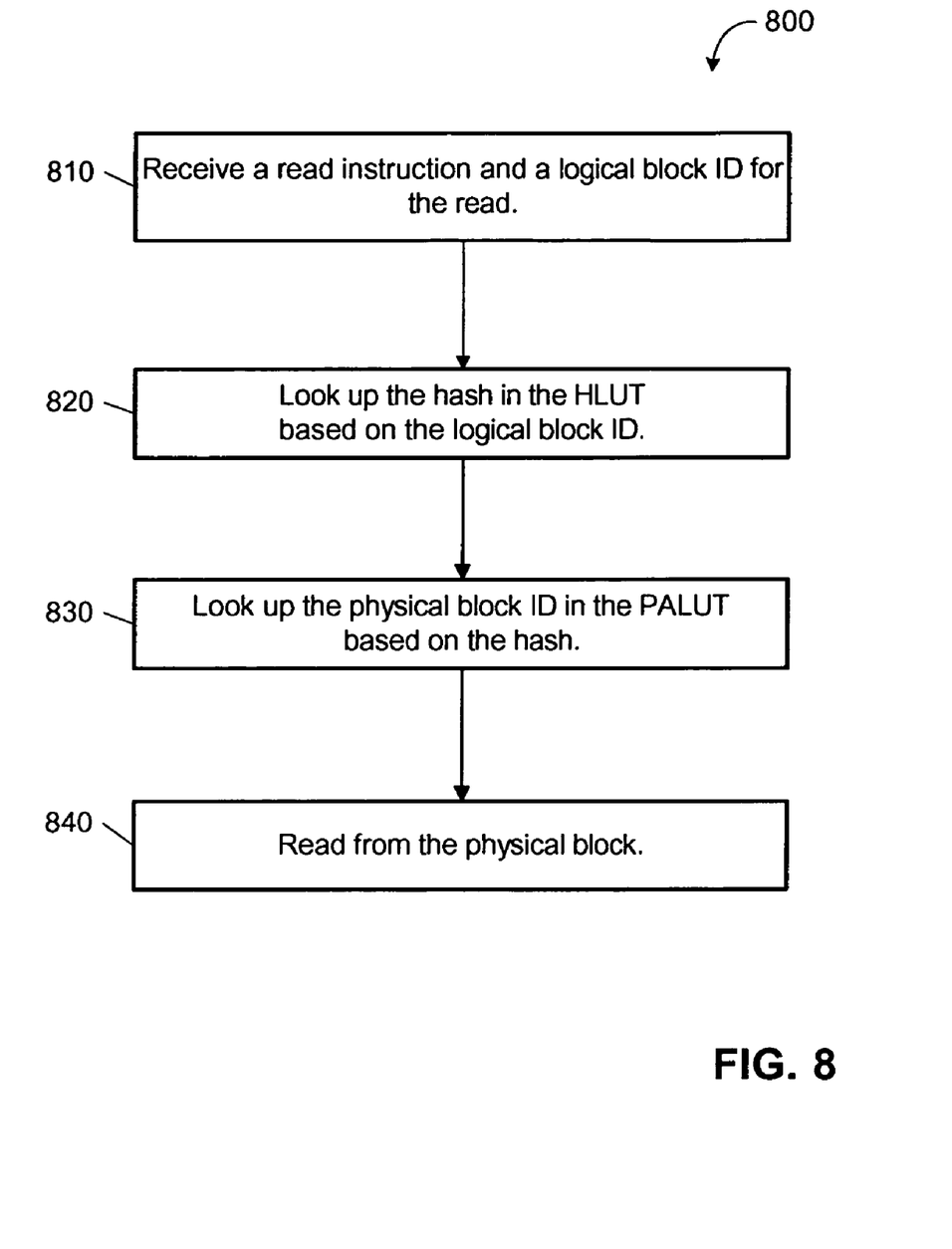
FIG. 8 is a flow diagram of one implementation of a procedure for reading data from a storage system.
Figure 9:
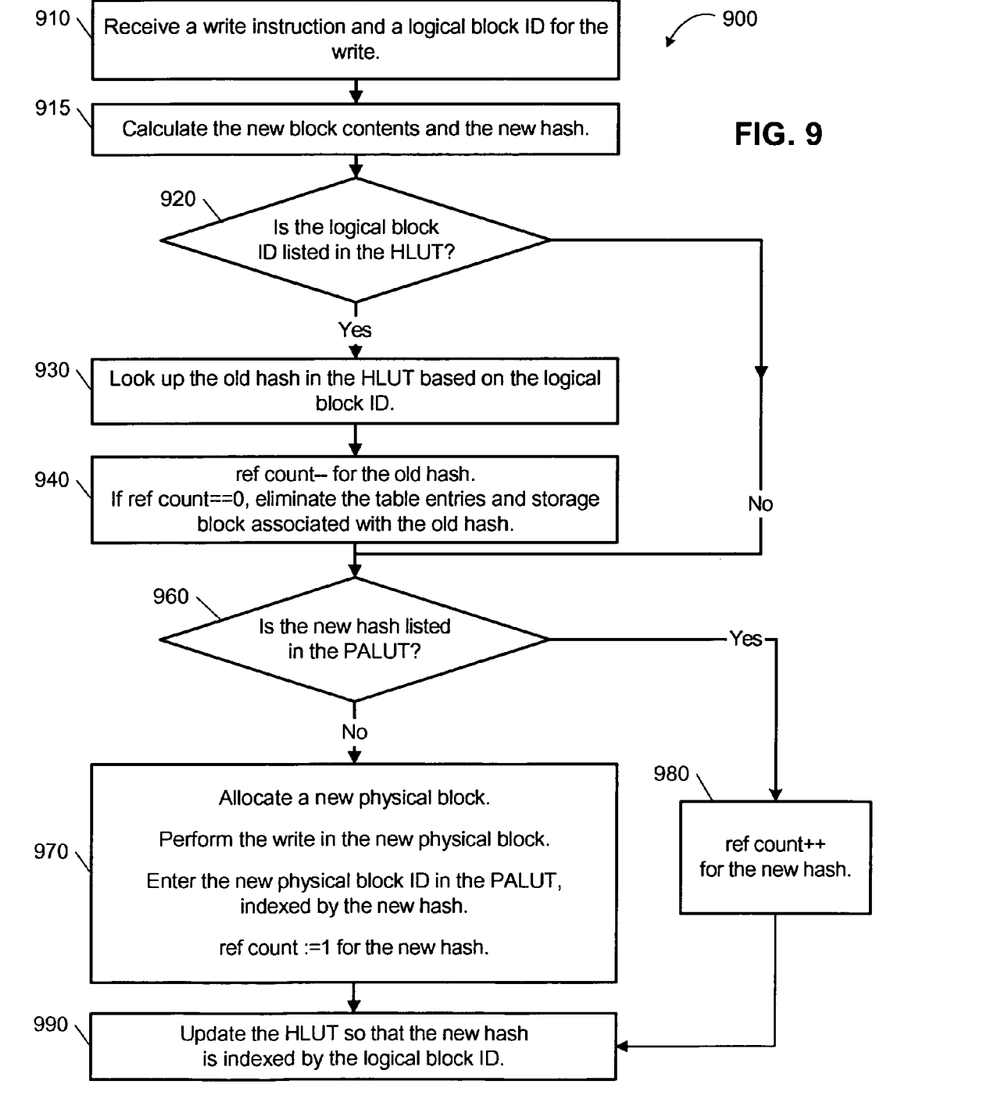
FIG. 9 is a flow diagram of one implementation of a procedure for writing data to a storage system.

Once a block-level SIS system has been created, subsequent reads and writes may be performed in a manner that preserves the single-instance features of the storage system. FIGS. 8 and 9 illustrate examples procedures that maintain the lookup tables 400 and 500 while performing SIS read and write operations on a storage system.

FIG. 8 is a flow diagram of one implementation of a procedure 800 for reading data from a storage system. The read procedure 800 may be executed, for example, by a volume manager software on a host such as the host 130. The read procedure 800 commences in act 810 by receiving a read instruction. The read instruction may be received from a file system or some other I/O management tool in the host. The read instruction indicates which data are to be read by providing one or more logical addresses for the data. The following discussion describes a read operation that reads from one logical address. It is also contemplated that a read operation may be carried out on one or more addresses or data blocks. In block-based storage systems, the logical address may typically be a logical block identifier, which indicates an address for a block of data in a logical address space, such as on one or more virtual storage devices.

In act 820, a hash lookup table is consulted to determine the hash value of the data to be read. The hash lookup table may have one entry for each valid logical address (or one entry for each in-use logical address) in the storage system. Each entry in the hash lookup table includes a hash value for the data stored at the logical address. The act 820 uses the hash lookup table to obtain a hash value that corresponds to the logical address received with the read instruction in the act 810.

In act 830, the procedure uses the hash value retrieved from the hash lookup table to consult a physical-address lookup table. The physical-address lookup table may have one entry for each hash value that is being used in the storage system. Each entry in the physical-address lookup table includes a physical address for the data having the hash value. In block-based storage systems, the physical address may typically be a physical block identifier, which indicates an address for a block of data on a storage device. The act 830 uses the physical-address lookup table to obtain a physical address that corresponds to the hash value retrieved in the act 820.

The read procedure 800 concludes in act 840 by reading data from the physical address obtained in the act 830.

FIG. 9 is a flow diagram of one implementation of a procedure for writing data to a storage system. The write procedure 900 may be executed, for example, by a volume manager software on a host such as the host 130. The write procedure 900 commences in act 910 by receiving a write instruction. The write instruction may be received from a file system or some other I/O management tool in the host. The write instruction indicates changes that are to be made to one or more blocks identified by one or more logical addresses. The logical addresses may be, for example, logical block identifiers. The following discussion describes a write operation that writes to one logical address. It is also contemplated that a write operation may be carried out on one or more addresses or data blocks.

In act 915, the procedure then determines the new contents of the data block that will result from the write operation, and calculates the new hash value for the new contents. The new contents may be specified in the write instruction that was received in the act 910. For example, if the write instruction included the entire contents of a block of data to be written, then those contents will be the new contents, and the new hash may be calculated directly from them.

More generally, however, the write instruction may indicate that only a potion of an existing data block is being overwritten, or perhaps that various logical functions are to be performed on one or more bits of the data block. In such situations, the existing data in the data block must be read in order to determine the contents that will result from the write operation. The act 915 may therefore read the existing (old) block contents in these situations. The old block contents may be obtained, for example, by performing the read procedure 400 (discussed above with reference to FIG. 8) on the logical address that was received in the act 910. These old block contents may then be stored in a temporary buffer memory. The write instruction may then be performed on the old block contents in the buffer memory, resulting in the new block contents being stored in the buffer memory. The new hash may then be calculated from the new contents in the buffer memory.

The write procedure 900 then advances to a test 920. The test 920 is the first of two decision points illustrated in the write procedure 900. The test 920 determines if the logical address to be written already exists in a hash lookup table. If the logical address to be written is not already listed in an entry in the hash lookup table, then this logical address is one that was not currently in use, and a new entry needs to be created in the hash lookup table. In this case, the write procedure 900 advances to a test 960.

The test 960 is the second decision point in the write procedure 900. The test 960 determines if the new hash value already exists in a physical-address lookup table. If the hash value is not already listed in an entry in the physical-address lookup table, then the write instruction may be understood as creating a data block with new data that did not currently exist in the data storage system. In this case, the write procedure 900 advances to act 970. In the act 970, the procedure allocates a new data block on the data storage system, and performs the write in the new data block. This write may be performed, for example, by copying the contents of the temporary buffer memory (from the act 915) into the new data block.

The act 970 also creates a new entry in the physical-address lookup table, so that the physical address of the new block of data is indexed by the hash value of the newly written data. The act 970 also creates a reference counter for this hash value, and sets the reference counter to an appropriate value (e.g., ref count:=1) that indicates that only one logical address on the data storage system refers to the new data corresponding to this hash value.

The procedure terminates in act 990 by updating the hash lookup table with the hash value calculated in the act 915 and with the logical address received in the act 910.

It is possible that the test 920 may determine that the logical address to be written is already listed in an entry in the hash lookup table. In this case, the write procedure 900 advances to acts 930 and 940 before reaching the test 960. In the act 930, the hash lookup table is consulted to determine the old hash value that was previously associated with the logical address. Since data are being written to this logical address, the old hash value will no longer be appropriate for this logical address. Accordingly, the reference count for this old hash value is decremented in the act 940 to indicate that the old hash value is now associated with one fewer logical addresses.

If the decremented reference count in the act 940 indicates that the old hash value is no longer associated with any logical addresses (e.g., ref count==0), then the old hash value may be deemed to be no longer relevant. In this case, the associated entries in the hash lookup table and the physical-address lookup table may be deleted or otherwise eliminated. Also, the corresponding data block on the storage system may be erased and/or de-allocated, so that it is available for writing. (This old data block may then be used in a future occurrence of act 970, in which it may be re-allocated for the storage of a new data block.) The procedure 900 may then advance to the test 960.

It is also possible that the test 960 may determine that a new hash value already exists in the physical-address lookup table. If the hash value is already listed in an entry in the physical-address lookup table, then the write instruction is writing data that already exists in one of the data blocks on the data storage system. In this case, the write procedure 900 does not need to perform a physical write of the data, since a copy of the data is already present on the data storage system. Additionally, the write procedure 900 does not need to create an entry in the physical-address lookup table, since the existing entry already associates the new hash value with an appropriate data block. In this case, the write procedure 900 advances to act 980 (instead of act 970).

The act 980 increments the reference count for the new hash value. That is, if the reference count for this hash value previously indicated that four logical address were previously associated with this hash value (e.g., ref count==4), then the reference count is modified to indicate that five logical address are now associated with this hash value after the write procedure (e.g., ref count:=5). The procedure then terminates in the act 990 by updating the hash lookup table.

The procedures 700, 800, and 900 may be adapted in various ways. For example, the above discussions do not include protection against hash collisions. A hash collision is an error that could occur if a hash function produces two identical hash values for two different data blocks. In this case, the above procedures would incorrectly assume that the two data blocks are identical. This error is considered unlikely, since the probability of any two data blocks having the same hash value is small. (For example, if a flat hash function is used to generate 160-bit hashes, then the probability of two given data blocks having a hash collision is $2^{-160}$. In a storage system holding $2^{40}$ blocks of data, the probability of a hash collision occurring would be less than $(2^{40})^2 \times 2^{-160}/2 \approx 10^{-24}$.) Nonetheless, it is envisioned that the above-described procedures may be augmented to include collision-avoidance measures. For example, in acts that detect that two hash values are the same, a subsequent full or partial bitwise check may be made on the corresponding data blocks to verify that they are also the same before proceeding further.

As discussed above, a variety of block sizes and hash lengths may be used in various implementations of the procedures and systems described herein. Such selections may be made by a designer based on various factors such as block architecture, maximum amount of storage to be supported, available computation speed, desired read/write access speed, and desired resistance to hash collisions. It also contemplated that a variety of types of hash functions may be used, with the selection of a hash function being made by a designer based on similar considerations. Further, it is contemplated that more than one hash function and/or more than one hash length may be used in a system, either in general or on a case-by case basis for various entries in the hash lookup table. Such an implementation may provide, for example, enhanced collision resistance. Various other methods of hardening the hash-functions may also be used to reduce the chances of collisions.

Figure 10:
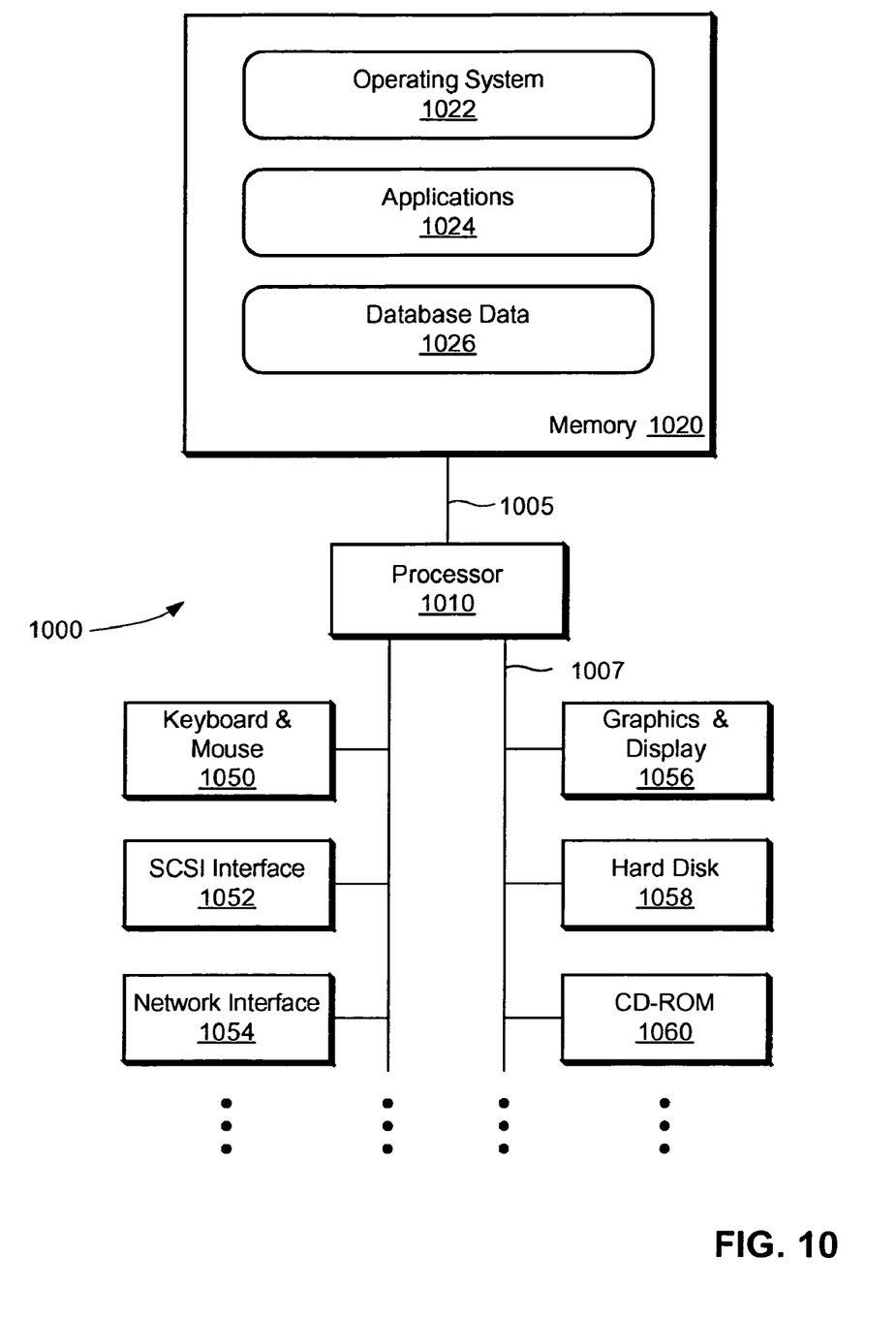
FIG. 10 is a block diagram of one implementation of a computer system.

FIG. 10 is a block diagram of one implementation of a computer system that may be used for or more of the techniques described herein. For example, the computer system 1000 may be an implementation of one of the previously described hosts 130 or 140, or storage devices 160, 170, or 180. The computer system 1000 may include a processor 1010 and a memory 1020 coupled together by a communications bus 1005. The processor 1010 may be a single processor or a number of individual processors working together. The memory 1020 is typically random access memory (RAM), or some other dynamic storage device. Alternatively, or in addition, the memory 1020 may include other forms of removable or fixed media (such as hard disks, tapes, or other magnetic media; CD-ROM, DVD-RW, or other optical media; or flash memory or other nonvolatile (or volatile) semiconductor memory; among others). The memory 1020 may also be capable of storing instructions to be executed by the processor, e.g., operating system 1022, and applications 1024, as well as database data 1026. The database data 1026 may include lookup tables. The applications 1024 may include single-host or distributed applications, data backup applications, data protection systems for distributed applications, file systems, and others. Memory 1020 may also be used for storing temporary variables or other intermediate information during the execution of instructions by the processor 1010.

The computer system 1000 may also include devices such as a keyboard & mouse 1050, a SCSI interface 1052, a network interface 1054, a graphics & display 1056, a hard disk 1058, and a CD-ROM 1060, all of which are coupled to the processor 1010 by a communications bus 1007. It will be apparent to those having ordinary skill in the art that the computer system 1000 may also include numerous elements not shown in the figure, such as additional storage devices, communications devices, input devices, and output devices, as illustrated by the ellipsis shown.

The flow charts of FIGS. 7-9 illustrate some of the many operational examples of the techniques disclosed in the present application. Those having ordinary skill in the art will readily recognize that certain steps or operations illustrated in FIGS. 7-9 may be eliminated or taken in an alternate order. Moreover, the methods described in FIGS. 7-9 are typically implemented as one or more software programs for a computer system and are encoded in a computer readable medium as instructions executable on one or more processors. The computer readable medium may include an electronic storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers and the types of operation of the computing system, e.g., various forms of storage virtualization, I/O operations, and addressing techniques.

Those having ordinary skill in the art will readily recognize that the techniques and methods discussed above may be implemented in software using a variety of computer languages, including, for example, traditional computer languages such as assembly language, Pascal, and C; object oriented languages such as C++, C#, and Java; and scripting languages such as Perl and Tcl/Tk. Additionally, the software 1024 may be provided to the computer system via a variety of computer readable media including electronic media (e.g., flash memory), magnetic storage media (e.g., the hard disk 1058, a floppy disk, etc.), optical storage media (e.g., the CD-ROM 1060), and communications media conveying signals encoding the instructions (e.g., via a network coupled to the network interface 1054).

Although the present invention has been described in connection with several implementations, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a first address of a data block;
   retrieving a signature corresponding to the first address, wherein the signature is derived from at least a portion of contents of the data block;
   retrieving a second address corresponding to the signature.

2. The method of claim 1, where the first address is received from an application by a storage manager, and the retrieving the signature is performed by the storage manager.

3. The method of claim 2, where the storage manager is a volume manager and the application is a file system.

4. The method of claim 1, where the first address is a logical block address and the second address is a physical block address.

5. The method of claim 1, where the signature is a hash of the data block.

6. The method of claim 1, further comprising:
   retrieving the data block from the second address.

7. The method of claim 1, further comprising:
   writing data to the data block at the second address.

8. The method of claim 7, where the writing is performed as necessary for single-instance storage.

9. The method of claim 1, further comprising:
   deleting the signature, if the data block becomes an unused data block.

10. The method of claim 1, further comprising:
    deleting the data block, if the data block becomes an unused data block.

11. A method comprising:
    receiving a first address;
    identifying data to be written at the first address;
    searching a first lookup table for the first address;
    generating a signature based at least in part on the data;
    searching a second lookup table for the signature; and
    updating the first lookup table with the first address and the signature.

12. The method of claim 11, further comprising:
    updating a reference count for the signature if the searching the second lookup table indicates that the signature is in the second lookup table; and
    updating a reference count for a previous signature if the searching the first lookup table indicates that the first address is in the first lookup table.

13. The method of claim 11, further comprising:
    writing the data if the searching the second lookup table indicates that the signature is not in the second lookup table.

14. The method of claim 13, where the writing the data comprises:
    writing the data at a second address; and
    updating the second lookup table with the second address.

15. The method of claim 14, where the first address is a logical block address and the second address is a physical block address.

16. The method of claim 11, where the first lookup table indexes signatures by first addresses, and where the second lookup table indexes second addresses by signatures.

17. A system comprising:
    a storage manager configured to interface with an application, where the application is configured to identify data blocks according to a first set of identifiers for the data blocks, and where the storage manager is configured to access the data blocks on a storage medium according to a second set of identifiers for the data blocks;
    a first lookup table that indexes data block signatures according to identifiers from the first set of identifiers, wherein each of the data block signatures is derived from at least a portion of contents of a corresponding data block;
    a second lookup table that indexes identifiers from the second set of identifiers according to the data block signatures.

18. The system of claim 17, where the first set of identifiers for the data blocks comprises logical block addresses, and where the second set of identifiers for the data blocks comprises physical block addresses.

19. The system of claim 17, where the data block signatures are hashes of data in corresponding data blocks.

20. The system of claim 17, where the storage manager implements single-instance storage.

21. A computer readable storage medium having encoded thereon program instructions executable on one or more processors, the computer readable storage medium being at least one of an electronic storage medium, a magnetic storage medium, or an optical storage medium, where the program instructions are executable to implement each of:
    receiving a first address of a data block;
    retrieving a signature corresponding to the first address, wherein the signature is derived from at least a portion of contents of the data block;
    retrieving a second address corresponding to the signature.

22. The computer readable storage medium of claim 21, where the first address is a logical block address and the second address is a physical block address, and where the signature is a hash of the data block.

23. A computer readable storage medium having encoded thereon program instructions executable on one or more processors, the computer readable storage medium being at least one of an electronic storage medium, a magnetic storage medium, or an optical storage medium, where the program instructions are executable to implement each of:
- receiving a first address;
- identifying data to be written at the first address;
- searching a first lookup table for the first address;
- generating a signature based at least in part on the data;
- searching a second lookup table for the signature;
- updating the first lookup table with the first address and the signature.

24. The computer readable storage medium of claim 23, where the program instructions are further executable to implement:
- writing the data at a second address if the searching the second lookup table indicates that the signature is not in the second lookup table.

25. The computer readable storage medium of claim 24, where the first address is a logical block address, where the second address is a physical block address, and where the signature is a hash of the data block.

* * * * *